United States Patent [19]

Mabuchi

[11] Patent Number: 5,760,915

[45] Date of Patent: Jun. 2, 1998

[54] COMMUNICATION SYSTEM CAPABLE OF CARRYING OUT COMMUNICATION OF SPEECH AND IMAGE WITH A SIMPLE STRUCTURE

[75] Inventor: Tetsuo Mabuchi, Tokyo, Japan

[73] Assignee: NEC Corporation, Japan

[21] Appl. No.: 651,885

[22] Filed: May 21, 1996

[30] Foreign Application Priority Data

May 22, 1995 [JP] Japan .................................. 7-122189

[51] Int. Cl.[6] ................................ G08G 1/09; H04N 1/00
[52] U.S. Cl. ...................... 358/407; 370/915; 370/916; 370/912; 370/276; 340/905
[58] Field of Search ........................... 358/400, 409, 358/442, 434–436, 438, 407; 455/49.1, 13.1, 61, 18; 370/276, 280, 494, 495, 498, 478, 537, 915, 916, 912

[56] References Cited

U.S. PATENT DOCUMENTS 5,345,594  9/1994  Tsuda ........................ 455/18

*Primary Examiner*—Thomas D. Lee
*Assistant Examiner*—Jerome Grant, II
*Attorney, Agent, or Firm*—Ostrolenk, Faber, Gerb & Soffen, LLP

[57] ABSTRACT

A communication system comprises a master station 21 and a plurality of slave stations 22-1 to 22-N each of which communicates with the master station through a radio channel carrying a communication signal by using time division multiple access. The slave stations are similar in structure to one another. The master station is similar in structure to each of slave stations. Each of the slave stations selectively transmits a speech signal and an image signal to the master station. On transmitting the speech signal, the speech signal is converted into an ADPCM signal. On transmitting the image signal, the image signal is converted into a PCM signal. The master station receives the communication signal which is transmitted from each of the slave stations. The master station detects whether or not the communication signal is representative of the ADPCM signal to selectively produce the speech signal and the image signal.

10 Claims, 3 Drawing Sheets

| $F_1$ | $F_2$ | $F_1$ | $F_2$ | $F_1$ | $F_2$ |

| $TS_1$ | $TS_2$ | $TS_3$ | ---------- | $TS_M$ |

FIG. 3

| $TS_{0A}$ | $TS_{0B}$ | $TS_{1A}$ | $TS_{1B}$ | $TS_{2A}$ | $TS_{2B}$ | ---------- | $TS_{MA}$ | $TS_{MB}$ |

FIG. 4

COMMUNICATION SYSTEM CAPABLE OF CARRYING OUT COMMUNICATION OF SPEECH AND IMAGE WITH A SIMPLE STRUCTURE

BACKGROUND OF THE INVENTION

This invention relates to a communication system capable of carrying out communication of speech and image.

In general, it is known that a communication system capable of carrying out transmission of a image signal such as a facsimile signal which may be coded into a coded signal of 32 kbps in accordance with adaptive differential pulse-code modulation (ADPCM) on the transmission. In case of ADPCM, it is difficult to carry out a high speed transmission of the image signal as known in the art. In order to carry out the high speed transmission of the image signal such as a facsimile signal, a conventional communication system has a high-speed digital network.

As readily understood from the above description, it is difficult for the conventional communication system to carry out transmission of the image signal by using a public telephone network which may be for use in transmission of a speech signal. In the other words, the conventional communication system has the public telephone network in addition to the high-speed digital network in order to carry out transmission of the image signal and the speech signal. Accordingly, it is difficult to construct a communication system with a simple structure in as much as the conventional communication system must has the high-speed digital network in order to carry out the high speed transmission of the image signal.

SUMMARY OF THE INVENTION

It is therefore an object of this invention to provide a communication system capable of carrying out communication of speech and image with a simple structure.

Other objects of this invention will become clear as the description proceeds.

On describing the gist of this invention, it is possible to understand that a communication system using time division multiple access and comprising a master station and a plurality of slave stations each of which communicates with the master station through a radio channel carrying a communication signal.

According to this invention, the above-mentioned master station comprises first master means selectively supplied with master speech and image signals as a master input signal for converting the master input signal into a master coded signal, master detecting means for detecting whether or not the master coded signal is the master image signal to produce a first master detection signal when the master coded signal is the master speech signal, the master detecting means producing a second master detection signal when the master coded signal is the master image signal, second master means responsive to the first master detection signal for compressing the master coded signal into a master compressed signal, and third master means responsive to the first master detection signal for producing the communication signal in accordance with the master compressed signal, the master producing means being responsive to the second master detection signal to produce the communication signal in accordance with the coded signal.

Each of the slave stations comprises first slave means selectively supplied with slave speech and image signals as a slave input signal for converting the slave input signal into a slave coded signal, slave detecting means for detecting whether or not the slave coded signal is the slave image signal to produce a first slave detection signal when the slave coded signal is the slave speech signal, the slave detecting means producing a second slave detection signal when the slave coded signal is the slave image signal, second slave means responsive to the first slave detection signal for compressing the slave coded signal into a slave compressed signal, and third slave means responsive to the first slave detection signal for producing the communication signal in accordance with the slave compressed signal, the slave producing means being responsive to the second slave detection signal to produce the communication signal in accordance with the coded signal.

BRIEF DESCRIPTION OF THE DRAWINGS

FIG. 3 is a signal format used in the radio communication system illustrated in FIG. 2; and FIG. 4 is another signal format used in the radio communication system illustrated in FIG. 2.

DESCRIPTION OF THE PREFERRED EMBODIMENT

Figure 1:
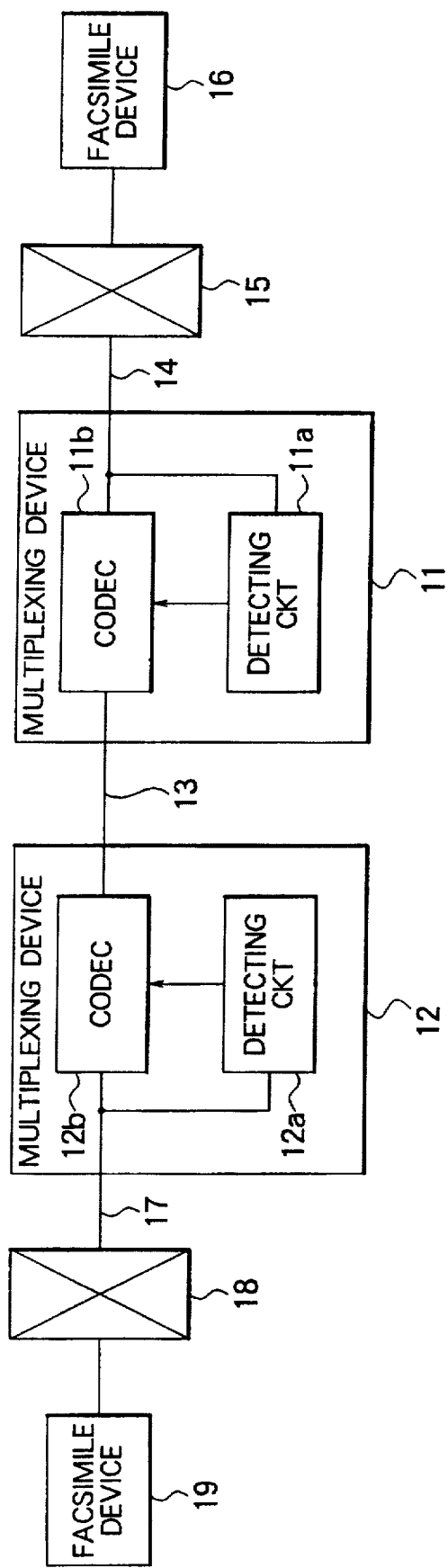
FIG. 1 is a block diagram of a conventional communication system.

Referring to FIG. 1, a conventional communication system will be described at first in order to facilitate an understanding of this invention. The illustrated communication system may be for use in transmitting an image signal which is, for example, a facsimile signal. The communication system comprises first and second multiplexing devices 11 and 12 which are connected to each other through a first high-speed digital private line 13. Through a second high-speed digital private line 14, the first multiplexing device 11 is connected to a first exchange 15 which is connected to a first facsimile device 16. Through a third high-speed digital private line 17, the second multiplexing device 12 is connected to a second exchange 18 which is connected to a second facsimile device 19.

Although illustration is not made in FIG. 1, each of the first and the second exchanges 15 and 18 may be connected to a plurality of telephone devices. Furthermore, each of the first and the second exchanges 15 and 18 may be connected to a public telephone network.

Now, it will be assumed that the first facsimile device 16 transmits a facsimile signal to the second facsimile device 19. As known in the art, a communication path is established between the first facsimile device 16 and the second facsimile device 19 under control of each of the first and the second exchanges 15 and 18. After establishment of the communication path, the first facsimile device 16 transmits a facsimile mode signal on the communication path. After that, the first facsimile device 16 transmits the facsimile signal on the communication path. The facsimile mode signal and the facsimile signal are supplied to first multiplexing device 11 through the first exchange 15.

In the first multiplexing device 11, a detecting circuit 11a is responsive to the facsimile mode signal to put a coder-and-decoder (CODEC) circuit 11b into a facsimile mode. In the facsimile mode, the CODEC circuit 11b converts the facsimile signal into a coded facsimile signal. More particularly, the CODEC circuit 11b converts the facsimile signal into an ADPCM data signal of 32 kbps when the facsimile signal is representative of a PCM data signal of 64 kbps.

The ADPCM data signal is supplied with the second multiplexing device 12 through the first high-speed digital private line 13. The second multiplexing device 12 is similar in structure to the first multiplexing device 11. Namely, the second multiplexing device 12 comprises a detecting circuit 12a and a CODEC circuit 12b. In the second multiplexing device 12, the CODEC circuit 12b demodulates the ADPCM data signal of 32 kbps into the PCM data signal of 64 kbps to deliver the PCM data signal as a demodulated signal to the second facsimile device 19 through the second exchange 18.

As readily understood from the above description, it is difficult to construct a communication system having a simple structure in as much as the communication system must has high-speed digital private lines in order to carry out the high speed transmission of the facsimile signal.

Figure 2:
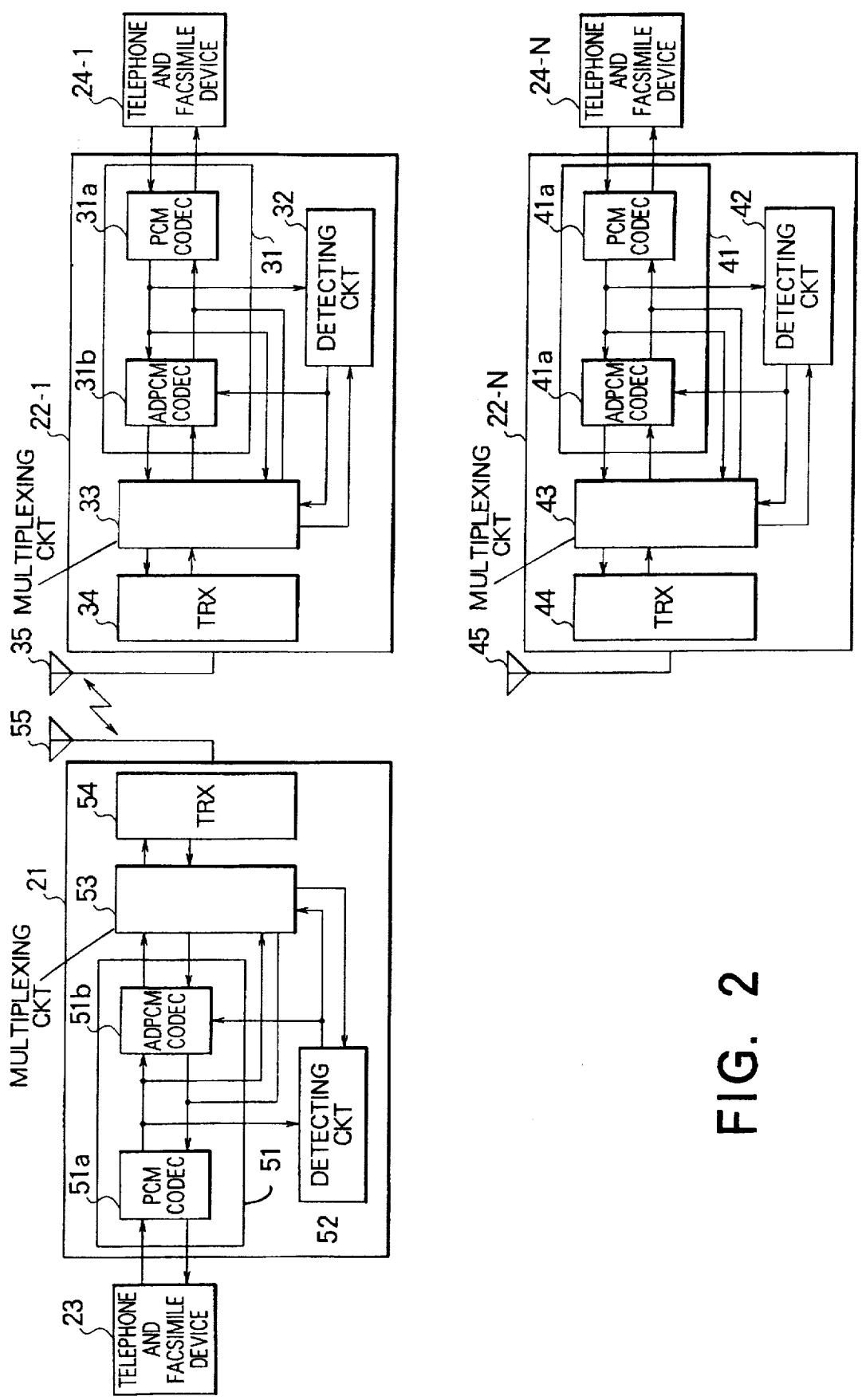
FIG. 2 is a block diagram of a radio communication system according to a preferred embodiment of this invention.

Referring to FIG. 2, description will proceed to a radio communication system according to a preferred embodiment of this invention. The illustrated radio communication system comprises a master station 21 and first through N-th slave stations 22-1 to 22-N each of which communicates with the master station 21 through a radio channel carrying a communication signal. The communication signal has a signal format which comprises a plurality of time slots. Each of the first through the N-th slave stations 22-1 to 22-N communicates with the master station 21 by using at least one of the time slots in the communication signal. Namely, the radio communication system uses time division multiple access (TDMA) in order to carry out communication between the master station 21 and each of first through the N-th slave stations 22-1 to 22-N. More particularly, demand assignment multiple access (DAMA) may be, for example, used as TDMA.

The master station 21 is connected to a master telephone and facsimile device 23. The first through N-th slave stations are connected to first through N-th slave telephone and facsimile devices 24-1 to 24-N, respectively.

In the example being illustrated, the first through the N-th slave stations 22-1 to 22-N is similar in structure to one another. The master station 21 is similar in structure to each of the first through the N-th slave stations 21. The first slave station 22-1 comprises a slave coder-decoder (CODEC) section 31, a slave detecting circuit 32, a slave multiplexing circuit 33, a slave transmitter-receiver (TRX) 34, and an antenna 35. Similarly, the N-th slave station 22-1 comprises a slave coder-decoder (CODEC) section 41, a slave detecting circuit 42, a slave multiplexing circuit 43, a slave transmitter-receiver (TRX) 44, and an antenna 45. The master station 21 comprises a master coder-decoder (CODEC) section 51, a master detecting circuit 52, a master multiplexing circuit 53, a master transmitter-receiver (TRX) 54, and an antenna 55.

Attention will be directed to the first slave station 22-1. The first telephone and facsimile device 24-1 selectively operable as a telephone device and a facsimile device. In other words, the first telephone and facsimile device 24-1 selectively produces a speech signal and a facsimile signal as a slave input signal. The first slave input signal is supplied to the CODEC section 31.

The CODEC section 31 comprises first slave CODEC circuit (PCM CODEC) 31a and a second slave CODEC circuit (ADPCM CODEC) 31b. Supplied with the first slave input signal, the first slave CODEC circuit 31a converts the slave signal into a slave coded signal which may be, for example, a pulse code modulation (PCM) signal of 64 kbps. The slave coded signal is supplied to the second slave CODEC circuit 31b, the slave detecting circuit 32, and the slave multiplexing circuit 33.

Supplied with the slave coded signal, the slave detecting circuit 32 detects whether or not the slave coded signal is the facsimile signal to produce a first slave detection signal when the slave coded signal is the speech signal. When the slave coded signal is the facsimile signal, the slave detecting circuit 32 produces a second slave detection signal.

The second slave CODEC circuit 31b is put into operation in response to the first slave detection signal to compress the slave coded signal into a slave compressed signal which may be, for example, an adaptive differential pulse code modulation (ADPCM) signal of 32 kbps. The slave compressed signal is delivered to the slave multiplexing circuit 33. Responsive to the first slave detection signal, the slave multiplexing circuit 33 receives the slave compressed signal therein in order to produce the communication signal. Otherwise, the slave multiplexing circuit 33 receives the slave coded signal therein in response to the second slave detection signal in order to produce the communication signal.

Referring to FIG. 3, the communication signal has a signal format which comprises a multiframe structure. More particularly, the signal format has primary frame F1 and a subsidiary frame F2 following the primary frame F1. In the example being illustrated, the multiframe is composed of the primary and the subsidiary frames F1 and F2. Each of the primary and the subsidiary frames F1 and F2 has first through M-th time slots TS1 to TSM, where M represents a positive integer which is greater one. The first through the M-th time slots will be called first through M-th primary time slots in the primary frame F1, respectively. The first through the M-th time slots will be called first through M-th subsidiary time slots in the subsidiary frame F2, respectively.

Again referring to FIG. 2, the slave multiplexing circuit 33 may use i-th primary and i-th subsidiary time slots in response to the first slave detection signal on producing the communication signal, where i is variable between 1 and M, both inclusive. The slave multiplexing circuit 33 may use either one of the i-th primary and the i-th subsidiary time slots in response to the second slave detection signal on producing the communication signal.

The communication signal is supplied to the transmitter-receiver 34. The transmitter-receiver 34 transmits the communication signal as a slave transmission signal to the master station 21 through the antenna 35.

Referring to FIG. 4, the communication signal may have a signal format which is a plurality of frames. Each of the frames has zero-th through M-th time slots each of which comprises a pair of sub-time slots. Namely, each of the zero-th through the M-th time slots has primary and subsidiary time slots. More particularly, the zeroth time slot has sub-time slots TS0A and TS0B. The first time slot has sub-time slots TS1A and TS1B. The second time slot has sub-time slots TS2A and TS2B. Siimilarly, the M-th time slot has sub-time slots TSMA and TSMB.

In FIG. 2, the slave multiplexing circuit 33 may use two sub-time slots of j-th time slots in response to the first slave detection signal on producing the communication signal, where j is variable between 0 and. M, both inclusive. The slave multiplexing circuit 33 may use either one of two sub-time slots in the j-th time slots in response to the second slave detection signal on producing the communication signal.

As readily understood from the above description, an n-th slave station selectively transmits the speech signal and the facsimile signal to the master station 21 by using at least one time slot in the communication signal, where n is a variable between one and N, both inclusive.

Referring to FIG. 2, attention will be directed to the master station 21. The master station 21 may selectively transmit a speech signal and a facsimile signal to at least one of the first through the N-th slave stations 22-1 to 22-N. Now, it will be assumed that the master station 21 selectively transmits the speech signal and the facsimile signal to the first slave station 22-1.

The master telephone and facsimile device 23 selectively operable as a telephone device and a facsimile device. In other words, the master telephone and facsimile device 23 selectively produces a speech signal and a facsimile signal as a master input signal. The master input signal is supplied to the master CODEC section 51.

Supplied with the master input signal, the first master CODEC circuit (PCM CODEC) 51a converts the master input signal into a master coded signal which may be, for example, a pulse code modulation (PCM) signal of 64 kbps. The master coded signal is supplied to the second master CODEC circuit (ADPCM CODEC) 51b, the master detecting circuit 52, and the master multiplexing circuit 53.

Suppled with the master coded signal, the master detecting circuit 52 detects whether or not the master coded signal is the facsimile signal to produce a first master detection signal when the master coded signal is the speech signal. When the master coded signal is the facsimile signal, the master detecting circuit 52 produces a second master detection signal.

The second master CODEC circuit 51b is put into operation in response to the first master detection signal to compress the master coded signal into a master compressed signal which may be, for example, an adaptive differential pulse code modulation (ADPCM) signal of 32 kbps. The master compressed signal is delivered to the master multiplexing circuit 53. Responsive to the first master detection signal, the master multiplexing circuit 53 receives the master compressed signal therein in order to produce the communication signal in a similar fashion described in conjunction with FIG. 3. Otherwise, the master multiplexing circuit 53 receives the master coded signal therein in response to the second master detection signal in order to produce communication signal.

The communication signal is supplied to the master transmitter-receiver 54. The transmitter-receiver 54 transmits the communication signal as a master transmission signal to one of the first through the N-th slave stations 22-1 to 22-N through the antenna 55.

As described above, the first slave station transmits the slave transmission signal to the master station 21. The slave transmission signal is received as a master reception signal at the master station 21. The master transmitter-receiver 54 is supplied with the master reception signal to demodulate the master reception signal into a master demodulated signal. The master demodulated signal is delivered to the master multiplexing circuit 53. The multiplexing circuit 53 may selectively produce the slave coded signal and the slave compressed signal as a master output signal in accordance with the master demodulated signal. The master output signal is delivered to the master detecting circuit 52.

Supplied with the master output signal, the master detecting circuit 52 detects whether or not the master output signal is the slave compressed signal to produce a third master detection signal when the master output signal is representative of the ADPCM signal. When the master output signal is representative of the PCM signal, the master detecting circuit 52 produces a fourth master detection signal.

Responsive to the third master detection signal, the multiplexing circuit 53 supplies the master output signal to the second master CODEC circuit 51b. The second master CODEC circuit 51b put into operation in response to the third master detection signal to convert the master output signal into a master PCM signal representative of the speech signal. The master PCM signal is supplied to the first master CODEC circuit 51a. The first master CODEC circuit 51a decodes the master PCM signal into the speech signal which is suppled to the master telephone and the facsimile device 23.

On the other hand, the master multiplexing circuit 53 supplies the master output signal to the first master CODEC circuit 51a in response to the fourth master detection signal. The first master CODEC circuit 51a decodes the master output signal PCM signal into the facsimile signal which is suppled to the master telephone and the facsimile device 23.

Again referring to FIG. 2, the first slave station may receive the master transmission signal as a slave reception signal from the master station 21. The slave transmitter-receiver 34 is supplied with the slave reception signal to demodulated the slave reception signal into a slave demodulated signal. The slave demodulated signal is delivered to the slave multiplexing circuit 33. The slave multiplexing circuit 33 may selectively produce the master coded signal and the master compressed signal as a slave output signal in accordance with the slave demodulated signal. The slave output signal is delivered to the slave detecting circuit 32.

Supplied with the slave output signal, the slave detecting circuit 32 detects whether or not the slave output signal is representative of the ADPCM signal to produce a third slave detection signal when the slave output signal is the ADPCM signal. When the slave output signal is representative of the PCM signal, the slave detecting circuit 32 produces a fourth slave detection signal.

Responsive to the third slave detection signal, the slave multiplexing circuit 33 supplies the slave output signal to the second slave CODEC circuit 31b. The second slave CODEC circuit 31b put into operation in response to the third slave detection signal to convert the slave output signal into a slave PCM signal representative of the speech signal. The slave PCM signal is supplied to the first slave CODEC circuit 31a. The first CODEC circuit 31a decodes the slave PCM signal into the speech signal which is suppled to the first slave telephone and the facsimile device 24-1.

On the other hand, the slave multiplexing circuit 33 supplies the slave output signal to the first slave CODEC circuit 31a in response to the second slave detection signal. The first CODEC circuit 31a decodes the slave output signal into the facsimile signal which is suppled to the master telephone and the facsimile device 23.

Although description is not made a regards operations of the second though the N-th slave stations, each of the second through the N-th slave stations operates in the fashion described in conjunction with the first slave station.

What is claimed is:

1. A communication system using time division multiple access and including a master station and a plurality of slave stations each of which communicates with said master station through a radio channel carrying a communication signal, said master station receiving said communication signal from at least a specific one of said slave stations, each of said slave stations comprising:

first slave means selectively supplied with slave speech and image signals as a slave input signal for converting said slave input signal into a slave coded signal, slave detecting means for detecting whether or not said slave coded signal is said slave image signal to produce a first slave detection signal when said slave coded signal is said slave speech signal, said slave detecting means producing a second slave detection signal when said slave coded signal is said slave image signal;

second slave means responsive to said first slave detection signal for compressing said slave coded signal into a slave compressed signal; and third slave means responsive to said first slave detection signal for producing said communication signal in accordance with said slave compresses signal, said third slave means being responsive to said second slave detection signal to produce said communication signal in accordance with said slave coded signal;

said master station comprising:

first master means selectively supplied with master speech and image signals as a master input signal for converting said master input signal into a master coded signal, said first master means being selectively supplied with a master output signal and a master decompressed signal as a slave supplied signal for converting said slave supplied signal into a slave decoded signal;

master detecting means for detecting whether or not said master coded signal is said master image signal to produce a first master detection signal when said master coded signal is said master speech signal, said master detecting means producing a second master detection signal when said master coded signal is said master image signal, said master detecting means detecting whether or not said master output signal is representative of the slave image signal to produce a third master detection signal when said master output signal is representative of said slave speech signal, said master detecting means producing a fourth master detection signal when said master output signal is representative of said slave image signal;

second master means responsive to said first master detection signal for compressing said master coded signal into a master compressed signal, said second master means being responsive to said third master detection signal for decompressing said master output signal into said master decompressed signal; and third master means responsive to said first master detection signal for producing said communication signal in accordance with said master compressed signal, said third master means being responsive to said second master detection signal to produce said communication signal in accordance with said master coded signal, said third master means being supplied with said communication signal from said specific slave station to produce said slave coded and said slave compressed signals as said master output signal, said third master means being responsive to a fourth master detection signal to supply said master output signal to said first master means.

2. A communication system as claimed in claim 1, wherein:

each of said slave and said master coded signals is a PCM signal of 64 kbps; and each of said slave and said master compressed signals is an ADPCM signal of 32 kbps.

3. A communication system as claimed in claim 2, wherein:

said communication signal has a multi-frame comprising a plurality of time slots;

said slave coded signal being carried on a predetermined time slot in each frame of said multi frame; and said slave compressed signal being carried on a prescribed time slot in said multi-frame.

4. A communication system as claimed in claim 2, wherein:

said communication signal has a multi-frame comprising a plurality of time slots;

said master coded signal being carried on a predetermined time slot in each frame of said multi-frame; and said master compressed signal being carried on a prescribed time slot in said multi-frame.

5. A communication system using time division multiple access and comprising a master station and a plurality of slave stations each of which communicates with said master station through a radio channel carrying a communication signal, each of said slave stations receiving said communication signal from said master station, each of said slave stations comprises:

first slave means selectively supplied with slave speech and image signals as a slave input signal for converting said slave input signal into a slave coded signal, said first slave means being selectively supplied with a slave output signal and a slave decompressed signal as a master supplied signal for converting said master supplied signal into a master decoded signal;

slave detecting means for detecting whether or not said slave coded signal is said slave image signal to produce a first slave detection signal when said slave coded signal is said slave speech signal, said slave detecting means producing a second slave detection signal when said slave coded signal is said slave image signal, said slave detecting means detecting whether or not said slave output signal is representative of said slave image signal to produce a third detection signal when said slave output signal is representative of a master speech signal, said slave detecting means producing a fourth slave detection signal when said slave output signal is representative of said master image signal;

second slave means responsive to said first slave detection signal for compressing said slave coded signal into a slave compressed signal, said second slave means being responsive to said third slave detection signal for decompressing said slave output signal into said slave decompressed signal; and third slave means responsive to said first slave detection signal for producing said communication signal in accordance with said slave compressed signal, said third slave means being responsive to said second slave detection signal to produce said communication signal in accordance with said slave coded signal, said third slave means being supplied with said communication signal from said master station to produce said slave coded and said slave compressed signals as said slave output signal, said third slave means being responsive to said fourth slave detection signal to supply said slave output signal to said first slave means;

said master station comprising:

first master means selectively supplied with master speech and image signals as a master input signal for converting said master input signal into a master coded signal;

master detecting means for detecting whether or not said master coded signal is said master image signal to produce a first master detection signal when said master coded signal is said master speech signal, said master detecting means producing a second master detection signal when said master coded signal is said master image signal;

second master means responsive to said first master detection signal for compressing said master coded signal into a master compresses signal; and third master means responsive to said first master detection signal for producing said communication signal in accordance with said master compressed signal, said third master means being responsive to said second master detection signal to produce said communication signal in accordance with said master coded signal.

6. A communication system as claimed in claim 5, wherein:

each of said slave and said master coded signals is a PCM signal of 64 kbps; and each of said slave and said master compressed signals is an ADPCM signal of 32 kbps.

7. A communication system as claimed in claim 6, wherein:

said communication signal has a multi-frame comprising a plurality of time slots;

said slave coded signal being carried on a predetermined time slot in each frame of said multi-frame; and said slave compressed signal being carried on a prescribed time slot in said multi-frame.

8. A communication system as claimed in claim 6, wherein:

said communication signal has a multi-frame comprising a plurality of time slots;

said master coded signal being carried on a predetermined time slot in each frame of said multi-frame; and said master compressed signal being carried on a prescribed time slot in said multi-frame.

9. A communication system using time division multiple access and including a master station and a plurality of slave stations each of which communicates with said master station through a radio channel carrying a communication signal, said master station receiving said communication signal from at least a specific one of said slave stations, each of said slave stations comprising:

a first slave circuit selectively supplied with slave speech and image signals as a slave input signal to convert said slave input signal into a slave coded signal, a slave detector detecting whether or not said slave coded signal is said slave image signal to produce a first slave detection signal when said slave coded signal is said slave speech signal, said slave detector producing a second slave detection signal when said slave coded signal is said slave image signal;

a second slave circuit responsive to said first slave detection signal to compress said slave coded signal into a slave compressed signal; and a third slave circuit responsive to said first slave detection signal to produce said communication signal in accordance with said slave compressed signal, said third slave circuit being responsive to said second slave detection signal to produce said communication signal in accordance with said slave coded signal;

said master station comprising:

a first master circuit selectively supplied with master speech and image signals as a master input signal to convert said master input signal into a master coded signal, said first master circuit being selectively supplied with a master output signal and a master decompressed signal as a slave supplied signal for converting said slave supplied signal into a slave decoded signal;

a master detector detecting whether or not said master coded signal is said master image signal to produce a first master detection signal when said master coded signal is said master speech signal, said master detector producing a second master detection signal when said master coded signal is said master image signal, said master detector detecting whether or not said master output signal is representative of the slave image signal to produce a third master detection signal when said master output signal is representative of said slave speech signal, said master detector producing a fourth master detection signal when said master output signal is representative of said slave image signal;

a second master circuit responsive to said first master detection signal to compress said master coded signal into a master compressed signal, said second master circuit being responsive to said third master detection signal for decompressing said master output signal into said master decompressed signal; and a third master circuit responsive to said first master detection signal to produce said communication signal in accordance with said master compressed signal, said third master circuit being responsive to said second master detection signal to produce said communication signal in accordance with said master coded signal, said third master circuit being supplied with said communication signal from said specific slave station to produce said slave coded and said slave compressed signals as said master output signal, said third master circuit being responsive to a fourth master detection signal to supply said master output signal to said first master circuit.

10. A communication system using time division multiple access and comprising a master station and a plurality of slave stations each of which communicates with said master station through a radio channel carrying a communication signal, each of said slave stations receiving said communication signal from said master station, each of said slave stations comprises:

a first slave circuit selectively supplied with slave speech and image signals as a slave input signal to convert said slave input signal into a slave coded signal, said first slave circuit being selectively supplied with a slave output signal and a slave decompressed signal as a master supplied signal for converting said master supplied signal into a master decoded signal;

a slave detector detecting whether or not said slave coded signal is said slave image signal to produce a first slave detection signal when said slave coded signal is said slave speech signal, said slave detector producing a second slave detection signal when said slave coded signal is said slave image signal, said slave detector detecting whether or not said slave output signal is representative of said slave image signal to produce a third detection signal when said slave output signal is representative of a master speech signal, said slave detector producing a fourth slave detection signal when said slave output signal is representative of said master image signal;

a second slave circuit responsive to said first slave detection signal to compress said slave coded signal into a slave compressed signal, said second slave circuit being responsive to said third slave detection signal for decompressing said slave output signal into said slave decompressed signal; and a third slave circuit responsive to said first slave detection signal to produce said communication signal in accordance with said slave compressed signal, said third slave circuit being responsive to said second slave detection signal to produce said communication signal in accordance with said slave coded signal, said third slave circuit being supplied with said communication signal from said master station to produce said slave coded and said slave compressed signals as said slave output signal, said third slave circuit being responsive to said fourth slave detection signal to supply said slave output signal to said first slave circuit;

said master station comprising:

a first master circuit selectively supplied with master speech and image signals as a master input signal to convert said master input signal into a master coded signal;

a master detector detecting whether or not said master coded signal is said master image signal to produce a first master detection signal when said master coded signal is said master speech signal, said master detector producing a second master detection signal when said master coded signal is said master image signal;

a second master circuit responsive to said first master detection signal to compress said master coded signal into a master compressed signal; and a third circuit means responsive to said first master detection signal for producing said communication signal in accordance with said master compressed signal, said third master circuit being responsive to said second master detection signal to produce said communication signal in accordance with said master coded signal.

* * * * *